United States Patent Office 2,759,895

Patented Aug. 21, 1956

2,759,895

PROCESS FOR INTRODUCING IMPURITIES

Emanuel Belmont, North Adams, Mass., assignor to Sprague Electric Company, North Adams, Mass., a corporation of Massachusetts No Drawing. Application April 2, 1953, Serial No. 346,537

4 Claims. (Cl. 252—62.3)

This invention relates to semiconducting materials and more particularly to a process for producing semiconducting materials having homogeneous distribution of impurities within the crystal.

The conduction of the semiconductor is greatly influenced by the presence of impurities, which impurities must be controlled in concentration and preferably evenly distributed throughout the lattice of the semiconducting crystal. Previous investigations have attempted to form *n* and *p* type germanium by nuclear transformation but it has been subject to the difficulty that a high flux density is necessary to produce the desired amount of impurities. Additionally the impurity produced by this transformation is not homogeneously distributed throughout the crystal lattice. The direct addition of specific impurities requires a knowledge of the phase diagram of the mixture or their respective distribution coefficients in order to control the amount of impurity added to the crystal. This direct addition of the impurity thus necessitates a great deal of research prior to commercial production of the semiconducting crystal and furthermore is subject to segregation of the impurities within the crystal.

It is an object of this invention to overcome the foregoing and related disadvantages. It is a further object of this invention to produce a semiconducting crystal of readily controllable conductivity and a relatively homogeneous distribution of the impurity within the crystal. Further objects of this invention will be apparent from the following description and the appended claims.

These objects are attained in accordance with the invention wherein there is produced a semiconductor by the process comprising the addition of a radioactive metal to a melt of the same metal.

In another sense the invention is concerned with the process for producing a semiconductor of desired conductivity by the process comprising the addition of a radioactive isotope of a semiconductor to the melt of the same semiconductor material.

In one of its limited embodiments the invention is concerned with the process comprising steps of adding a minor amount of radioactive germanium to a melt of germanium and recrystallizing this mixture.

According to my invention I have found that a semiconductor of controlled resistivity having a relatively homogeneous distribution of the added impurity can be effected by utilization of the self-diffusion property of metals. By proper selection of a radio isotope, which decays rapidly to a stable isotope of the desired impurity to be added to the semiconducting material, there results a semiconducting material of controlled resistivity and homogeneously distributed impurity in a process susceptible to closely controlled quality manufacture of semiconducting materials.

The basic phenomena of self-diffusion of a metal within a melt has been studied and is well-known. It has been shown that the addition of a minor amount of like material to a large body will result in homogeneous distribution of the added material in the larger body. By the utilization of this phenomena of self-diffusion I have found that it is possible to incorporate a minor amount of a proper radio isotope of such material as germanium into a melt of germanium to yield a semiconducting material having homogeneously distributed impurities within the crystalline lattice.

As an example of the preparation of a semiconductor by my unique process I incorporate 0.2 of a curie of either $Ge^{69}$ or $Ge^{71}$ into 100 g. of germanium which in both cases yields a *p* type conduting material. The $Ge^{69}$ is transformed into $Ga^{69}$ while the $Ge^{71}$ is transformed into $Ga^{71}$; both isotopes of gallium being stable. It is thus seen that the addition of the radioactive germanium isotopes results in a semiconducting crystal of germanium having homogeneously distributed throughout its structure an impurity of gallium, said crystal being uniform in physical dimension and in resistivity. To form an *n* type semiconducting material with germanium it is merely necessary that the required amount of $Ge^{75}$, which undergoes nuclear transformation to $As^{75}$, be added to the germanium melt. To form a semiconducting crystal of silicon, $Si^{31}$, which decays to stable $P^{31}$, is added to a silicon melt which results in an *n* type semiconductor. In this latter case .2 of a curie of $Si^{31}$ is added to the silicon melt to form a semiconductor of a useful property.

A variation of my inventive process is the formation of semiconductors without the presence of impurities in the final semiconducting crystals.

This additional advantage which may not be apparent in the utilization of radioactive decay to form the doped semiconductor is the formation of lattice defects within the crystalline structure by the decay process. It is well-known that lattice defects alter the conductivity of the crystal and the decay technique can be used where the presence of impurities in the crystal is undesirable. As an example of this, arsenic, which decays to the stable isotope of germanium, is added to a melt of germanium to form a final crystal of pure germanium in which the lattice defects materially affect the electrical properties.

This inventive process is subject to further variations which are potentially important in the preparation of semiconducting materials. Where it is desired to add impurities to materials whose combined properties have not been determined, it is not possible to predict accurately the type of product which will result. To obtain such data necessary to accurately predict the product necessitates extensive rigorous research. On the other hand certain compounds have been extensively studied and phase diagrams and distribution coefficients are available in the literature. Thus by proper selection of starting materials whose systems have been fully investigated a combination may be achieved about which there is insufficient information. As an example of this procedure radioactive $Pb^{209}$ is incorporated into a melt of germanium; the lead-germanium system being well-known. As a result of the radioactive decay, abismuth-germanium alloy is produced without the necessity of any prior information of the bismuth-germanium system. Thus this variation of my inventive process offers a means of avoiding long and rigorous research to determine the product which results from the addition of impurities not previously studied.

In the particular case of elements which fall in the same family in the periodic table, results may be achieved which approximate the products of self-diffusion. By this it is meant that elements within the same family have similar physical and chemical properties. Thus the addition of a minor amount of one element to a major amount of the melt of another element of the same family will result in substantially homogeneous distribution of the minor component in the major. As an example, silicon and germanium will distribute themselves so as to form a homogeneous alloy. Radioactive silicon added to germanium will distribute itself homogeneously in the germanium and decay to phosphorous which if added originally would not have distributed itself in a homogeneous fashion but rather would tend to segregate on recrystallization of the melt. This feature of my invention is not restricted to the example set forth but is generally applicable to any element to be distributed in a melt of an element of the same family of the periodic table.

With the utilization of radioactive materials is the associated consideration of its being a possible health hazard. In my process no safeguards aside from monitoring of the operation and proper shielding are necessary and these are required for only a short period as my preferred added isotopes have half lives in the order of 24 hours. Within a reasonable time the activity has thus diminished to a tolerable low level.

My present process has the advantage of making possible homogeneously distributed impurities within the crystalline lattice of a semiconductor of readily controllable resistivity and physical dimension. A further advantage is that the addition of the impurity is easily controlled by monitoring the radiation. Another advantage is the formation of lattice defects in the crystal which affect its conductivity. It is to be noted that distribution of impurities within the crystalline lattice approaches that of a homogeneous distribution by the addition of radio isotopes of the same family of the periodic table as that of the melt and hence distribute quite well throughout the melt and subsequently decay into desired impurities which, in their final form, would not have tended to distribute effectively throughout the melt and therein remain during recrystallization. A final major advantage is that it is possible to take known information about the distribution coefficients and the phase diagrams of various systems and thereby predict results and achieve satisfactory products whose systems have not been extensively studied.

As many apparently widely different embodiments of this invention may be made without departing from the spirit and scope hereof, it is to be understood that the invention is not limited to the specific embodiments hereof except as defined in the appended claims.

What is claimed is:

1. A process comprising the steps of uniformly distributing a minor amount of radioactive germanium in a melt of germanium, and recrystallizing this mixture.

2. A process comprising the steps of uniformly distributing a minor amount of radioactive silicon in a melt of silicon, and recrystallizing this mixture.

3. A process for the production of a relatively conductive form of a semiconductor element in which the conductivity is substantially uniform throughout, the process including the steps of melting a stable semiconductor element, adding to the melt a minor quantity of a radioactive form of the same element to cause the added material to become uniformly distributed throughout the melt, crystallizing the resulting melt to produce a semiconductor crystal in which the radioactive portions decay and become converted to impurities that provide predetermined conductivity characteristics to the final product.

4. A process for the production of a solid element having uniformly distributed through it an impurity that is in a different family of the periodic system, the process including the steps of melting a stable form of said element, uniformly distributing in the melt a minor amount of a radioactive form of an element in the same family of the periodic system, the radioactive element being one that decays to form the desired impurity, and crystallizing the resulting mixture.

References Cited in the file of this patent

Electrical Engineering, December 1949, pp. 1047–56. Article by Lark-Horovitz. (Copy in 252–62.3.)